(12) United States Patent
Sutton et al.

(10) Patent No.: US 8,254,078 B2
(45) Date of Patent: Aug. 28, 2012

(54) BONDING LEAD

(75) Inventors: David Alistair Sutton, Bristol (GB); Colin John West, Bristol (GB)

(73) Assignee: Airbus Operations Limited, Bristol (GB)

(*) Notice: Subject to any disclaimer, the term of this patent is extended or adjusted under 35 U.S.C. 154(b) by 144 days.

(21) Appl. No.: 12/719,206

(22) Filed: Mar. 8, 2010

(65) Prior Publication Data
US 2010/0226061 A1   Sep. 9, 2010

(30) Foreign Application Priority Data

Mar. 9, 2009 (GB) .................................. 0904006.4

(51) Int. Cl.
*H05F 3/00* (2006.01)
(52) U.S. Cl. ........................................................ 361/218
(58) Field of Classification Search .................... 361/218
See application file for complete search history.

(56) References Cited

U.S. PATENT DOCUMENTS

| | | | | | |
|---|---|---|---|---|---|
| 2,133,863 | A | * | 10/1938 | Knoderer ................... | 174/106 R |
| 3,800,064 | A | * | 3/1974 | Lusk ............................ | 174/73.1 |
| 3,828,112 | A | * | 8/1974 | Johansen et al. ............. | 174/47 |
| 5,705,774 | A | * | 1/1998 | Beauchamp ............... | 174/121 R |
| 5,786,977 | A | | 7/1998 | Cohen | |
| 5,814,763 | A | * | 9/1998 | Kirma ....................... | 174/40 CC |
| 6,268,426 | B1 | | 7/2001 | Hirabayashi et al. | |
| 7,896,712 | B2 | * | 3/2011 | Cecil et al. ..................... | 439/730 |
| 2002/0117325 | A1 | * | 8/2002 | Mennone et al. .......... | 174/121 A |
| 2003/0040215 | A1 | | 2/2003 | Kleen | |
| 2005/0199417 | A1 | * | 9/2005 | Aisenbrey ................... | 174/126.1 |
| 2008/0078880 | A1 | | 4/2008 | Petit | |
| 2011/0186352 | A1 | * | 8/2011 | Cecil et al. ................... | 174/77 R |

FOREIGN PATENT DOCUMENTS

CN              101412835         11/2008
(Continued)

OTHER PUBLICATIONS

Timothy Russell et al., "The use of carbon nanotubes to improve conductive elastomers," Sealing Technology, Nov. 2005, pp. 12-14.

(Continued)

*Primary Examiner* — Ronald W Leja
(74) *Attorney, Agent, or Firm* — Lowe, Hauptman, Ham & Berner, LLP

(57) ABSTRACT

A joint on an aircraft, a bonding lead for use in such a joint, and a method of manufacturing such a joint. The bonding lead comprises an elongate conductive core with a pair of end faces at the extremities of its length. The conductive core is encapsulated along at least a majority of its length and at both end faces in a barrier layer typically formed from an elastomer. The lead is encapsulated along its length in the barrier layer apart from at a first contact region towards a first end of the bonding lead and a second contact region towards a second end of the bonding lead. A first electrical connector passes through a first hole in the barrier layer to engage the first contact region of the conductive core and provide an electrical connection between the conductive core and the first component; and a second electrical connector passes through a second hole in the barrier layer to engage the second contact region of the conductive core and provide an electrical connection between the conductive core and the second component.

13 Claims, 3 Drawing Sheets

FOREIGN PATENT DOCUMENTS

| | | | |
|---|---|---|---|
| EP | 0975911 | A1 | 2/2000 |
| EP | 1484245 | A1 | 12/2004 |
| GB | 2295594 | A | 6/1996 |
| JP | 3047298 | A | 7/1989 |
| JP | 2002117914 | A | 10/2000 |
| WO | 98/48207 | A1 | 10/1998 |

OTHER PUBLICATIONS

UK Search Report for GB0904006.4 dated Jul. 8, 2009.
UK Search Report for GB0918967.1 dated Feb. 25, 2010.
UK Search Report for GB0904007.2 dated Jul. 9, 2009.

* cited by examiner

BONDING LEAD

FIELD OF THE INVENTION

The present invention relates to a joint on an aircraft, a bonding lead for use in such a joint, and a method of manufacturing such a joint.

BACKGROUND OF THE INVENTION

There is a risk in aircraft of a build up of static electricity on one component in comparison to another component to which it is connected. In the prior art, a so-called bonding lead is connected to each side of the joint in order to electrically connect the components and prevent static build up. An example of such a bonding lead is described in the prior art section of US2008/0078880. Such bonding leads can also dissipate electrical energy during a lightning strike.

A problem with such bonding leads is that the lead is susceptible to corrosion, and can damage other components of the aircraft during installation, if the lead breaks free after installation, or if the components move during operation.

It is known to encapsulate electrical leads in heat-shrink insulating sleeves along their length. However the leads remain exposed to corrosion at their ends.

SUMMARY OF THE INVENTION

A first aspect of the invention provides a bonding lead comprising an elongate conductive core with a pair of end faces at the extremities of its length, wherein the conductive core is encapsulated along at least a majority of its length and at both end faces in a barrier layer.

A second aspect of the invention provides a joint on an aircraft comprising: a first component; a second component joined to the first component; a bonding lead comprising an elongate conductive core with a pair of end faces at the extremities of its length, wherein the conductive core is encapsulated at both end faces in a barrier layer and encapsulated along its length in the barrier layer apart from at a first contact region towards a first end of the bonding lead and a second contact region towards a second end of the bonding lead; a first electrical connector which engages the first contact region of the conductive core and provides an electrical connection between the conductive core and the first component; and a second electrical connector which engages the second contact region of the conductive core and provides an electrical connection between the conductive core and the second component.

A third aspect of the invention provides a method of manufacturing the joint of the second aspect of the invention, the method comprising providing a bonding lead comprising an elongate conductive core with a pair of end faces at the extremities of its length which is encapsulated along at least a majority of its length and at both end faces in a barrier layer; forming the first hole in the barrier layer to expose the first contact region of the conductive core; forming the second hole in the barrier layer to expose the second contact region of the conductive core; engaging the first contact region of the conductive core with the first electrical connector; and engaging the second contact region of the conductive core with the second electrical connector.

The barrier layer may be formed from any suitable material, but most preferably it is formed from a non-metallic material such as an elastomer. Elastomer is preferred for several reasons. Firstly an elastomer, being relatively resilient, can "self-heal" to a certain extent if it is pierced by a sharp object. Secondly, being relatively soft and flexible, elastomer will protect other elements of the aircraft in the event that the bonding lead breaks loose.

The barrier layer may be an insulator, or may have an element of conductivity. For instance it may comprise an elastomer loaded with conductive particles.

The bonding lead may be fully encapsulated along its length, at least during an initial stage of manufacturing. Alternatively the barrier layer may have a first hole in its side towards a first end of the bonding lead and a second hole in its side towards a second end of the bonding lead. These holes may be formed by removing the barrier layer (for instance by buffing) or may be formed in an initial moulding step in which case material does not need to be removed to form the holes.

The conductive core may comprise a cable and a pair of connection brackets which are attached to the cable at each end of the cable, wherein the cable and the connection brackets are encapsulated in the barrier layer, and wherein the end faces of the connection brackets constitute the end faces of the conductive core which are encapsulated in the barrier layer. The connection brackets may have through-holes which are filled by the barrier layer. The connection brackets may be attached to the cable by crimping, for example.

Washers may be embedded in the barrier layer towards first and second ends of the bonding lead. These may be electrically conductive (to provide an electrical connection with the conductive core) or may just be used to prevent compression set (or creep) of the barrier layer.

The electrical connectors may comprise clamps which grip the conductive core or the barrier layer without passing through it, but more typically each electrical connector passes through a hole in barrier layer, a hole in the conductive core, and a hole in one of the components.

The joint may be located anywhere on an aircraft but preferably the components are part of an aircraft fuel system. For instance the joint may be between two fuel pipes, or between an access panel and a fuel tank wall.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
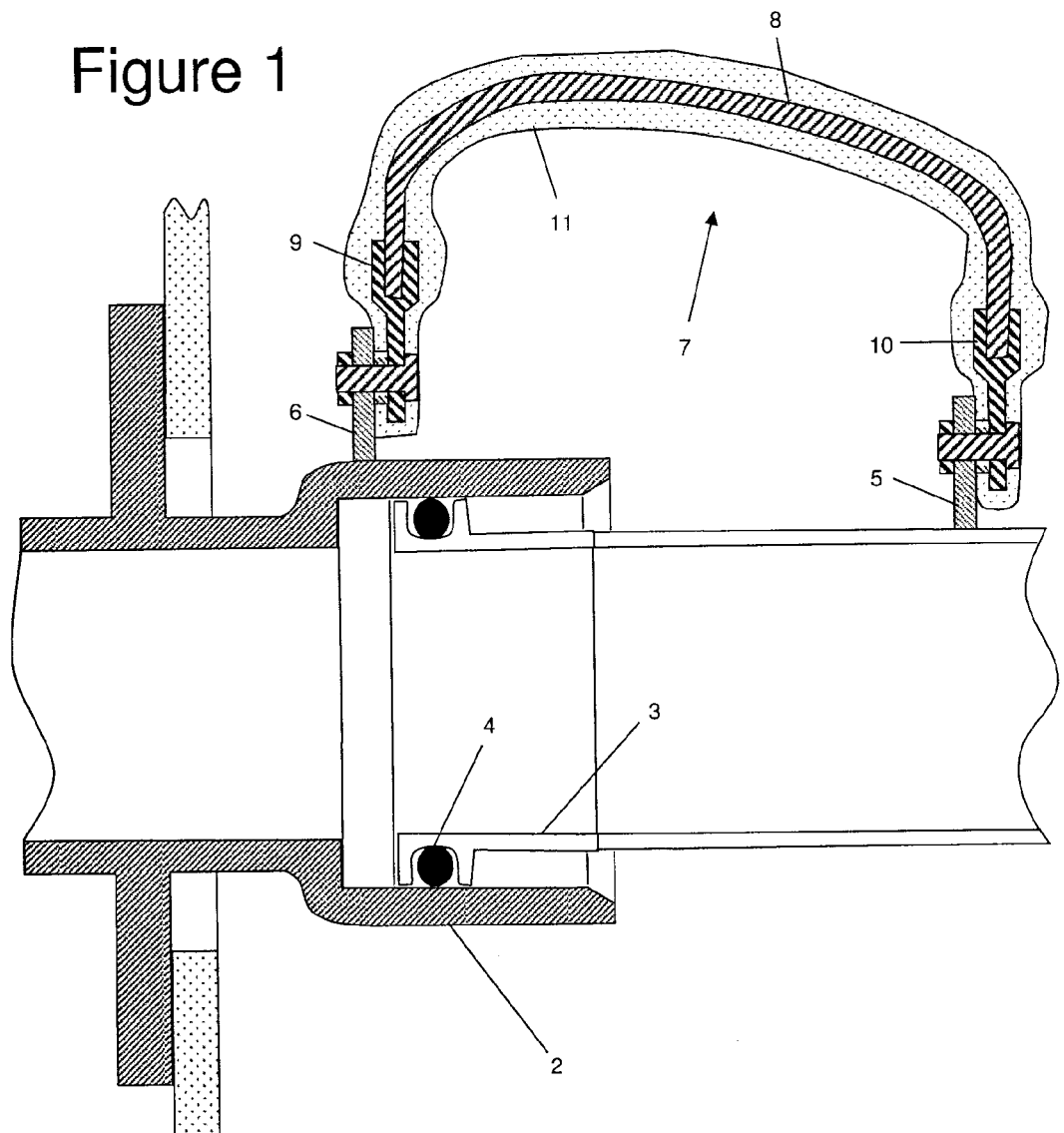
FIG. 1 is a sectional view of a joint according to an embodiment of the invention.

FIG. 1 shows fuel pipe joint on an aircraft. The joint comprises a socket 2, in which a pipe end fitting 3 is located, an O-ring seal 4 sealing the contact between the socket and the pipe end fitting, and a bonding lug 5 welded to the fuel pipe connected to the pipe end fitting 3. A further bonding lug 6 is machined on the socket arrangement and a bonding lead 7 is arranged between the two lugs 5, 6 electrically connecting one side of the joint to the other.

Figure 2:
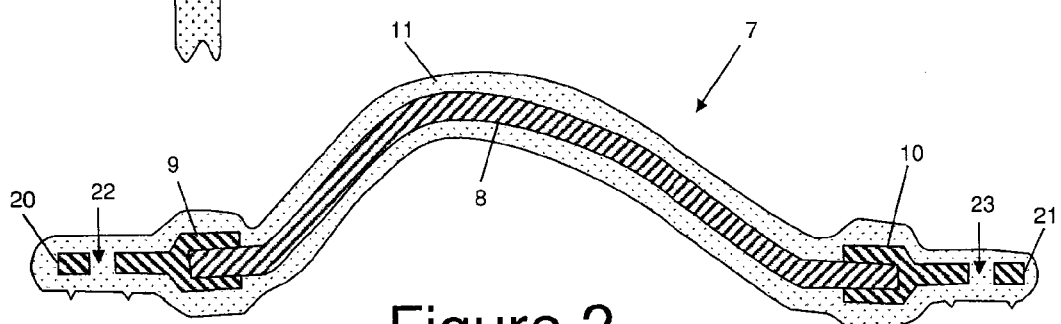
FIG. 2 is a side sectional view of a fully encapsulated bonding lead.
Figure 3:
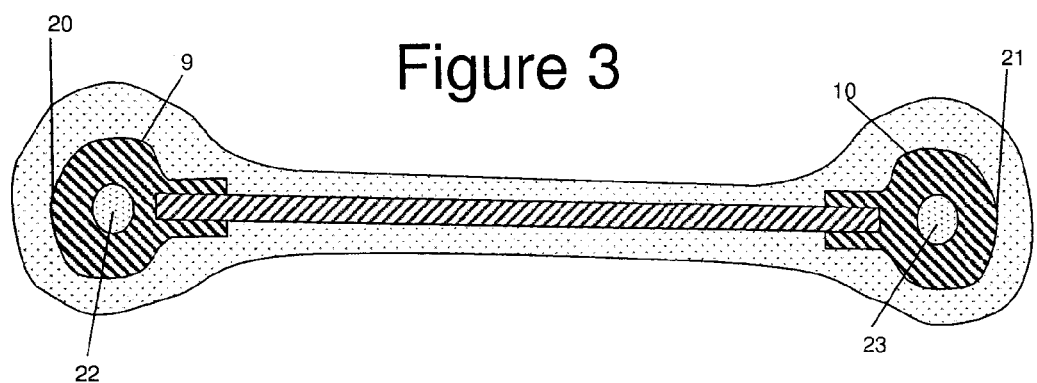
FIG. 3 is a plan sectional view of the bonding lead of FIG. 2.

The bonding lead 7 has a conductive core comprising a multi-stranded cable 8 and a pair of connection brackets 9, 10 which are crimped to the cable 8. As shown in FIGS. 2 and 3, the conductive core is elongate and has a pair of tips or end faces 20, 21 at the extremities of its length.

Typically the cable 8 and brackets 9, 10 are both formed from a metal such as copper, but optionally the cable and/or the brackets 9, 10 may be formed from spun long carbon nanotubes or carbon fibres which have a high breaking strength and better conductivity than copper. Such spun carbon nanotubes are available from Nanocomp Technologies as reported in aero-online.org, August 2008, page 12.

The conductive core (that is, the cable 8 and brackets 9, 10) is encapsulated in an injection moulded elastomeric barrier layer 11. Initially the conductive core is fully encapsulated as shown in FIGS. 2 and 3. That is, the elastomer encapsulates the conductive core at both end faces 20,21 and along its full length, as well as filling the through-holes 22, 23 in the brackets 9,10.

Figure 4:
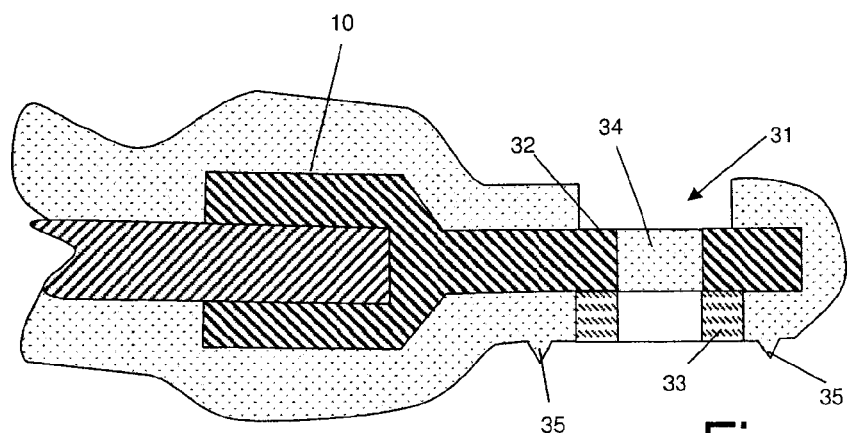
FIG. 4 is side sectional view of one end of the bonding lead.

In order to make a connection between the bonding lead 7 and the lugs 5, 6 a rotary tool buffs a first hole 31 in the top side of the elastomeric barrier layer as shown in FIG. 4, and an equivalent second hole at the other end of the bonding lead. This exposes an annular lateral contact region 32 in the side of the bracket 10 around the hole 23.

Next a second hole is buffed in the barrier layer on the underside of the barrier layer and a washer 33 is embedded into the barrier layer by pushing it into the hole. The washer 33 may be formed from a metal, or from an insulating material.

Figure 5:
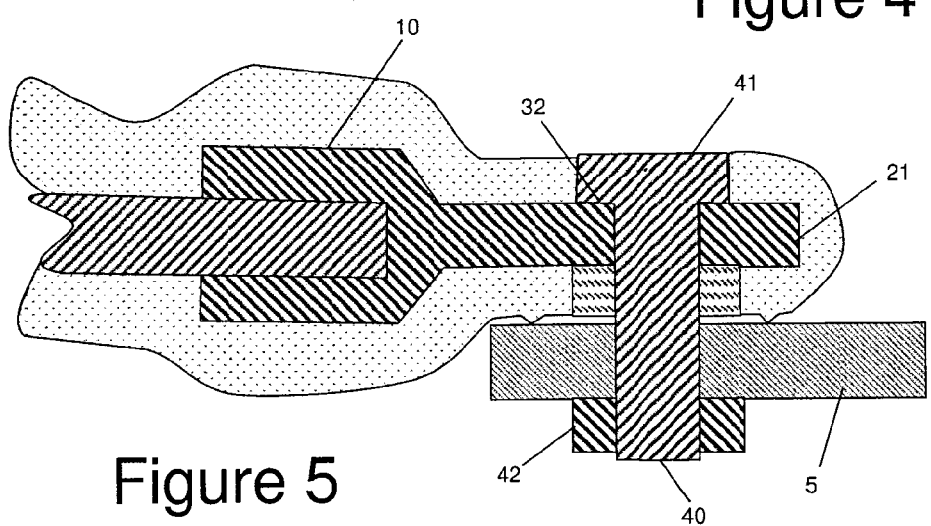
FIG. 5 is a side sectional view showing one end of the bonding lead bolted to a lug.

The remaining elastomer 34 which fills the hole in the bracket is then drilled away and the metal shaft 40 of a bolt is passed through the hole and secured to the lug by a nut 42 as shown in FIG. 5. The metal head 41 of the bolt engages the annular lateral contact region 32, providing a secure electrical connection with the bracket 10. The nut 42 engages the lug 5 to provide an equivalent secure electrical connection with the lug 5.

A moulded annular sealing ridge 35 is provided in the elastomer, and the ridge 35 is compressed as the nut is screwed tight so as to form a seal around the fastener which prevents fluid from flowing into the joint and corroding the bracket 10.

The washer 33 embedded in the barrier layer carries the compressive load of the fastener and thus prevents compression creep and fastener torque relaxation. The washer 33 may or may not be formed from a conductive material such as metal.

The barrier layer protects the conductive core from corrosion, and its soft nature also prevents the bonding lead from damaging other components of the aircraft during installation, and during operation of the aircraft. As shown in FIG. 5, the end 21 of the conductive core remains encapsulated at all times, that is both before and after installation.

The bonding lead 7 is easy to inspect visually—being located outside the socket 2. The conductive core of the bonding lead can be electrically tested by piercing the barrier layer 11 with an electrical probe and contacting the core. When the probe is removed, the hole in the barrier layer at least partially "self-heals" by closing up due to the resilience of the elastomeric material. A Shore hardness of approximately 40 is considered appropriate for this. The electrical conductivity could also checked after installation by testing the resistance across the joint which is being bridged by the bonding lead.

Optionally the elastomeric barrier layer may be loaded with conductive particles such as carbon black. This increases the conductivity of the bonding lead, and may make the hole 31 in the elastomer unnecessary because electrical contact can be made with the elastomer without engaging the conductive core. Thus in this case the bonding lead can be directly bonded or clamped to the structure removing the need for bolts.

Figure 6:
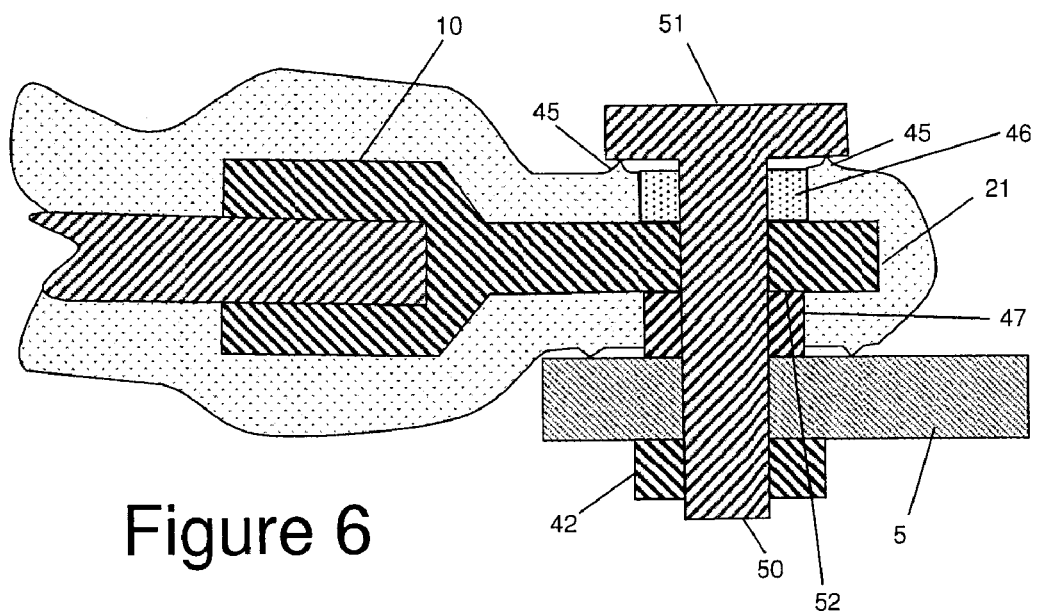
FIG. 6 is a side sectional view showing one end of a bonding lead bolted to a lug.

FIG. 6 is a sectional view of an alternative connection arrangement for the bonding lead of FIG. 2. In this case an insulating washer 46 is embedded in the barrier layer on one side of the bonding lead, and a conductive metal washer 47 is embedded in the barrier layer on the other side. A head 51 of a bolt engages an annular ridge 45 in the barrier layer, and can be tightened by a nut 42 on a threaded shaft 50. As the nut is tightened, the bolt compresses the washer 47 into engagement with the bonding lug 5, providing an electrical connection between the bonding lug and a lateral annular contact region 52 on the underside of the connection bracket 10. In this case the bolt is not required to be highly conductive.

Figure 7:
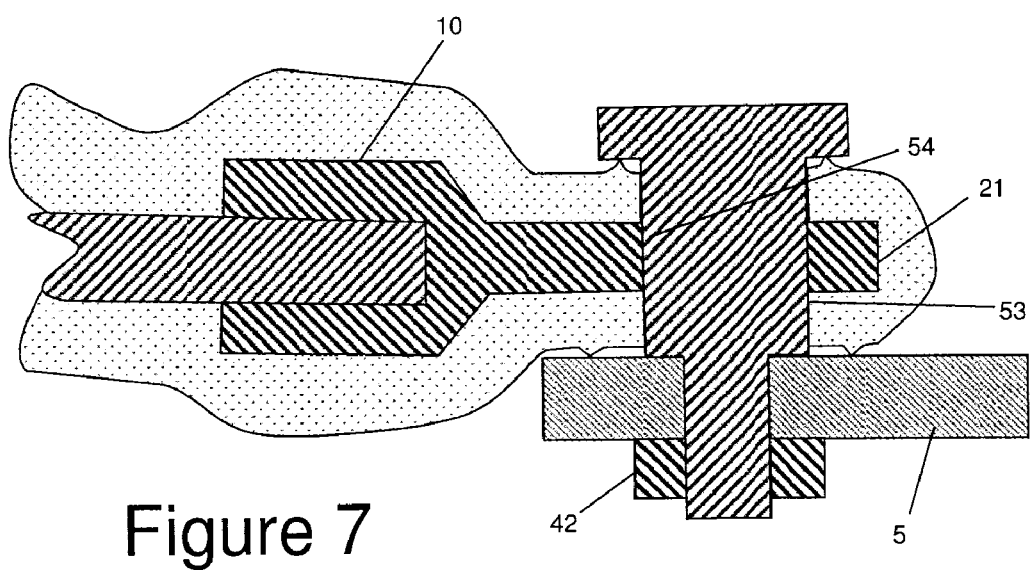
FIG. 7 is a side sectional view showing one end of a bonding lead bolted to a lug.

FIG. 7 is a sectional view of an alternative connection arrangement for the bonding lead of FIG. 2. In this case the washers 46, 47 are omitted and the bolt has a compression limiting ridge 53. The ridge is pushed through the bracket 10 as an interference fit, so the sides of the ridge 53 engage the wall 54 of the hole in the bracket 10. Thus instead of engaging with a lateral contact region on the side of the bracket, the bolt engages with an internal contact region defined by the wall 54 of the hole.

Although the invention has been described above with reference to one or more preferred embodiments, it will be appreciated that various changes or modifications may be made without departing from the scope of the invention as defined in the appended claims.

The invention claimed is:

1. A bonding lead comprising an elongate conductive core including a cable and a pair of connection brackets which are attached to the cable at each end of the cable, the bonding lead having a pair of end faces at the extremities of the connection brackets, wherein the conductive core is encapsulated within a barrier layer covering at least a majority of its length and both end faces, the barrier layer having a first hole in its side exposing a first contact region of one of the connection brackets and a second hole in its side exposing a second contact region of the other of the connection brackets.

2. The bonding lead of claim 1 wherein the barrier layer is an elastomeric barrier layer.

3. The bonding lead of claim 2 wherein the elastomeric barrier layer is loaded with conductive particles.

4. The bonding lead of claim 1 further comprising a first washer embedded in the barrier layer towards a first end of the bonding lead and a second washer embedded in the barrier layer towards a second end of the bonding lead.

5. The bonding lead of claim 4 wherein the first and second washers are electrically conductive.

6. A joint on an aircraft comprising: a first component; a second component joined to the first component; a bonding lead comprising an elongate conductive core including a cable and a pair of connection brackets which are attached to the cable at each end of the cable, the bonding lead having a pair of end faces at the extremities of the connection brackets, wherein the conductive core is encapsulated within a barrier layer covering at least a majority of the length of the cable and both end faces, the barrier layer having a first hole in its side exposing a first contact region of one of the connection brackets and a second hole in its side exposing a second contact region of the other of the connection brackets; a first electrical connector which engages the first contact region of the conductive core and provides an electrical connection between the conductive core and the first component; and a second electrical connector which engages the second contact region of the conductive core and provides an electrical connection between the conductive core and the second component.

7. The joint of claim 6 wherein each electrical connector passes through the first or second hole in the barrier layer, a hole in the conductive core and a hole in one of the components.

8. The joint of claim 6 wherein each electrical connector comprises an electrically conductive washer which is embedded in the barrier layer.

9. The joint of claim 6 wherein the contact regions of the conductive core are lateral contact regions on a side of the core.

10. The joint of claim 6 wherein the barrier layer is an elastomeric barrier layer.

11. The joint of claim 10 wherein the elastomeric barrier layer is loaded with conductive particles.

12. The joint of claim 6 wherein the components are part of an aircraft fuel system.

13. A method of manufacturing the joint of claim 6, the method comprising providing a bonding lead comprising an elongate conductive core including a cable and a pair of connection brackets which are attached to the cable at each end of the cable, the bonding lead having a pair of end faces at the extremities of the connection brackets, and the bonding lead being encapsulated within a barrier layer covering at least a majority of its length and both end faces; forming the first hole in the barrier layer to expose the first contact region of the conductive core; forming the second hole in the barrier layer to expose the second contact region of the conductive core; engaging the first contact region of the conductive core with the first electrical connector; and engaging the second contact region of the conductive core with the second electrical connector.

* * * * *